Dec. 3, 1940.     J. DE FRANCISCI     2,223,352
RACK ROD LOADING MECHANISM FOR ALIMENTARY PASTE PRESSES
Filed Aug. 8, 1939     4 Sheets-Sheet 1

INVENTOR.
Joseph DeFrancisci,
BY George D. Richards,
ATTORNEY.

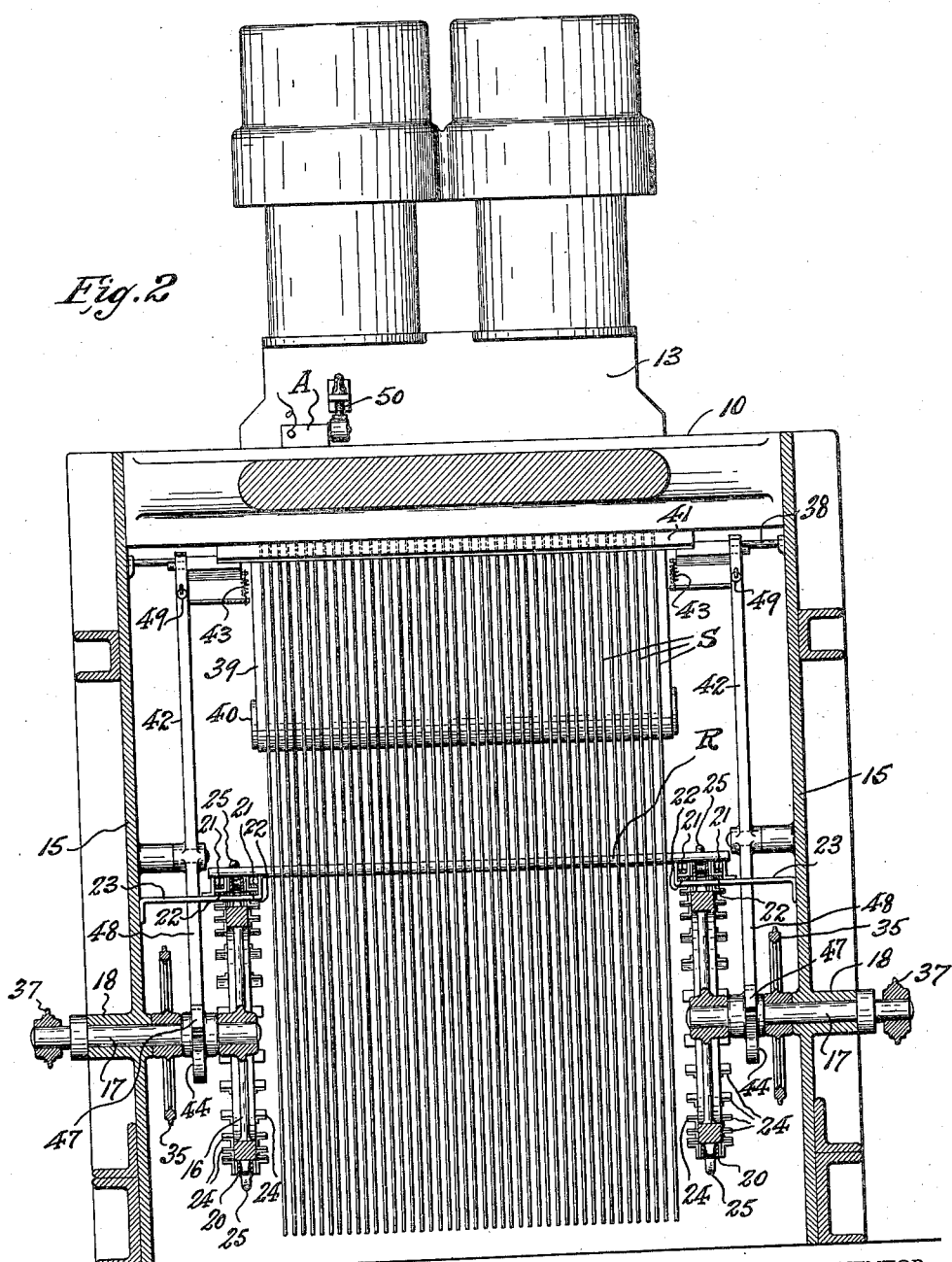

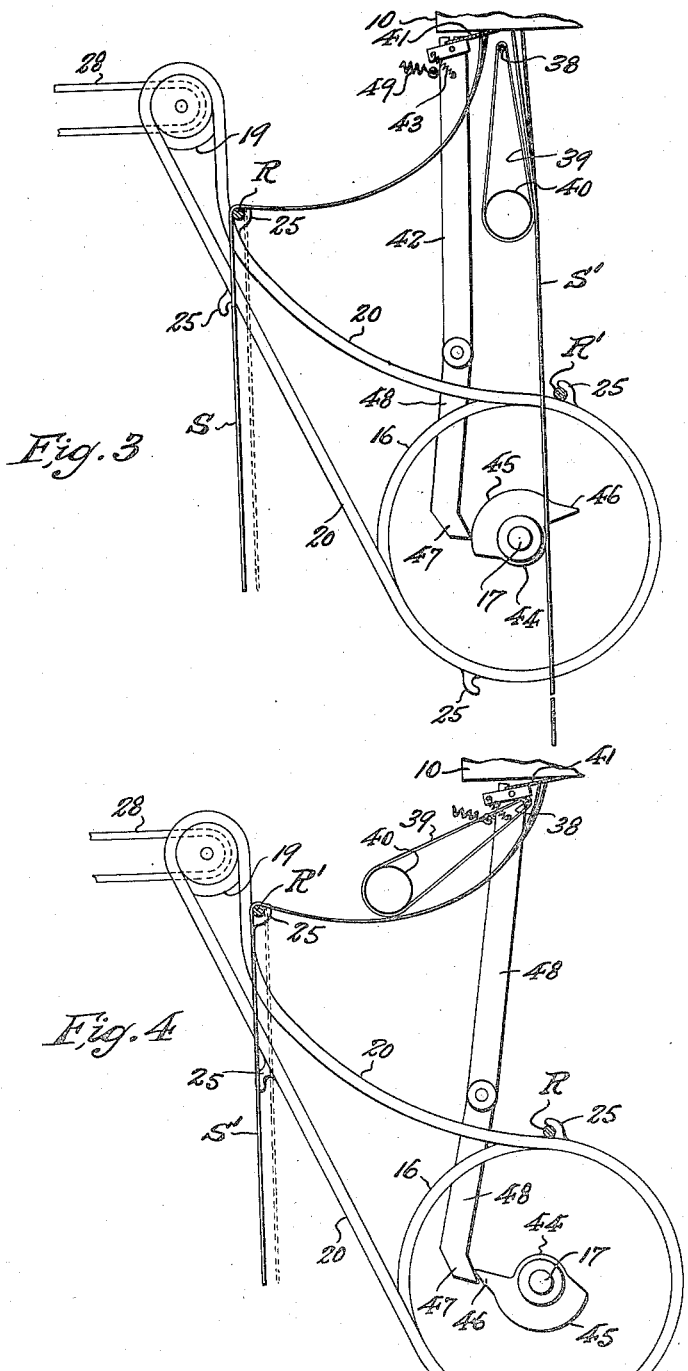

Dec. 3, 1940.  J. DE FRANCISCI  2,223,352
RACK ROD LOADING MECHANISM FOR ALIMENTARY PASTE PRESSES
Filed Aug. 8, 1939  4 Sheets-Sheet 4

INVENTOR.
Joseph DeFrancisci,
BY George D. Richards
ATTORNEY.

Patented Dec. 3, 1940

2,223,352

UNITED STATES PATENT OFFICE 2,223,352

RACK ROD LOADING MECHANISM FOR ALIMENTARY PASTE PRESSES

Joseph De Francisci, Brooklyn, N. Y.

Application August 8, 1939, Serial No. 288,934

13 Claims. (Cl. 107—7)

This invention relates to means for producing long alimentary paste products, such as spaghetti, macaroni, and the like; and this invention has reference, more particularly, to improved mechanism for automatically mounting dough strings, as expressed from the forming press apparatus, in suspended relation upon drier racking rods ready for racking in drier rooms or apparatus.

This invention has for an object to provide a novel construction of automatic drier rack rod loading mechanism for use in cooperation with a dough string extrusion press apparatus which is adapted to extrude said dough strings in spaced relation so as to form linear rows thereof ready for immediate deposit upon drier rack rods, such e. g. as an extrusion press apparatus of the general type and kind disclosed in my co-pending application for United States Letters Patent Serial No. 244,198, filed December 6, 1938.

This invention has for another object to provide a novel automatic rack rod loading mechanism provided with operating means so controlled as to synchronize its functions in timed relation to the dough string extruding operations of the extrusion press with which it is associated; said mechanism including means for severing extruded dough strings from the press die plate.

The invention has for another object to provide in the automatic rack rod loading mechanism a novel form and construction of rack rod conveyer means adapted to move the rack rods with a lifting motion against the row of dough strings to be looped thereover and suspended thereon.

A further object of the invention is to provide means for controlling the dough strings against displacement or slippage during the operations of loading the rack rods; said means being likewise adapted to separate a plurality of dough string rows subject to proper timed engagement by the respective rack rods upon which the same are to be mounted.

A still further object of the invention is to provide automatic cutter means for evenly trimming the extremities of the dough strings as suspended upon the rack rods upon which the same have been mounted.

Other objects of this invention, not at this time more particularly enumerated, will be understood from the following detailed description of the same.

Illustrative embodiments of this invention are shown in the accompanying drawings, in which:

Fig. 2 is a transverse vertical section of the same, taken on line 2—2 in Fig. 1.

Figs. 3 and 4 are schematic views illustrating steps in the operation of the mechanism shown in Figs. 1 and 2.

Similar characters of reference are employed in the above described views, to indicate corresponding parts.

Figure 1:
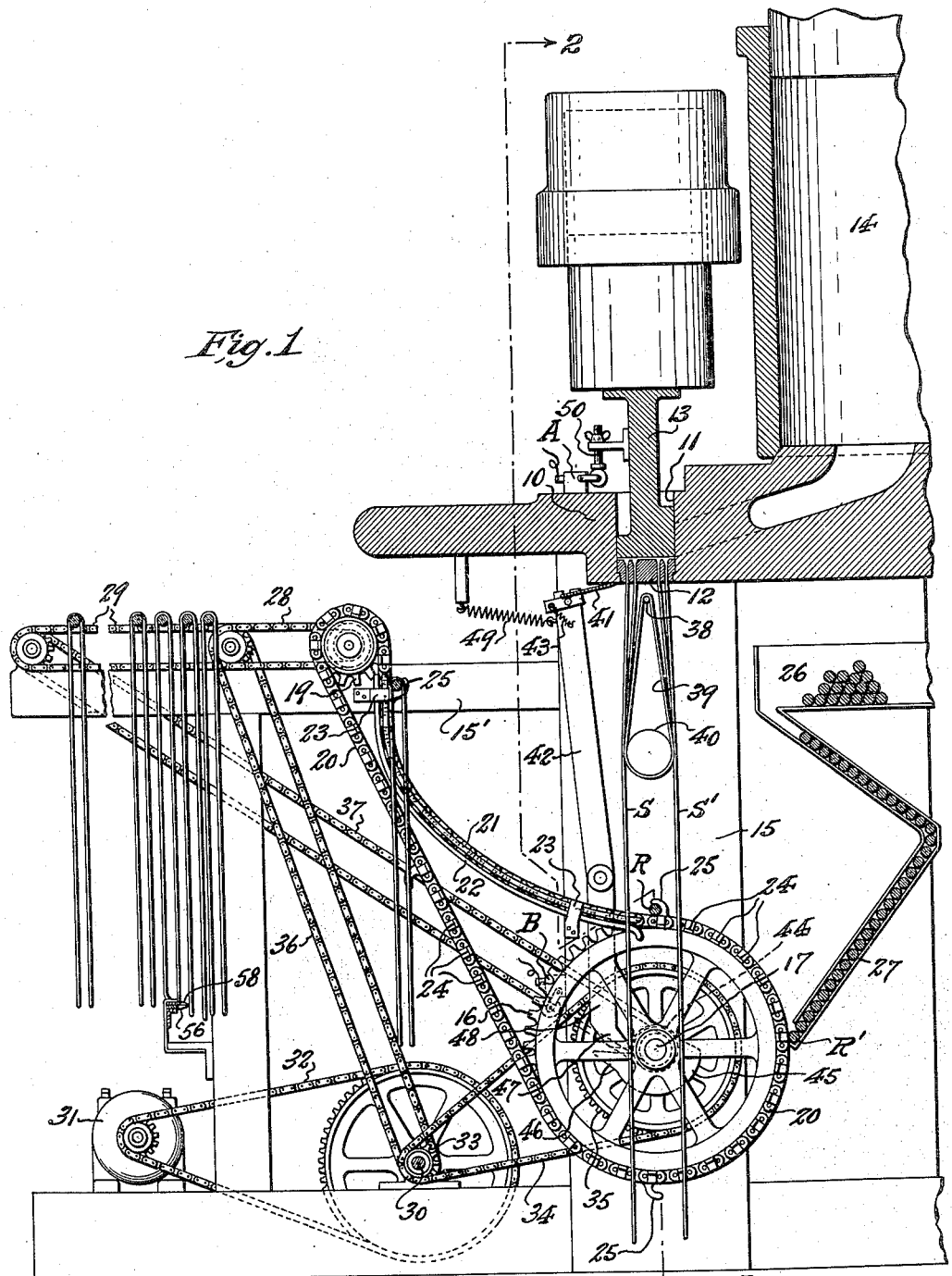
Fig. 1 is a vertical longitudinal section of a novel rack rod loading mechanism according to this invention.

The novel rack rod loading mechanism is arranged and mounted in cooperative relation to a dough batch extrusion press of the type comprising a dough batch receiving member 10 provided with an upwardly open rectangular chamber 11 of suitable length, width and height, and which is provided at its bottom with a perforate die plate 12, the die openings of which are arranged in one or more rows so that dough may be expressed therethrough to form one or more rows of linearly spaced strings, immediately ready for application to a drier rack rod. In the examples illustrated in the drawings, the extrusion press is equipped to express two linear rows of dough strings; said rows being laterally spaced apart. Arranged to enter through the upwardly open top of said batch receiving chamber 11, for vertical reciprocation therein, is a suitably actuated plunger member 13. The chamber 11 of the extrusion press may be supplied with dough in any suitable manner, as e. g. by means of a cooperating loading press 14 such as disclosed in my aforesaid copending application for patent Ser. No. 244,198.

The novel rack rod loading mechanism of this invention is mounted below the extrusion press in connection with laterally spaced side frame structures 15 by which the same is supported.

Mounted on the respective side frame structures are laterally spaced synchronously actuated dough string looping conveyer members, the same being so spaced as permit the rows of dough strings, expressed by the extrusion press, to descend vertically between the rack rod receiving ends thereof. Each conveyer member comprises a drive sprocket 16 of relatively large diameter disposed in vertically aligned, downwardly spaced relation to the discharge end of said extrusion press. Said sprockets 16 are carried by shafts 17 suitably journaled in bearings 18 with which the side frame structures 15 are provided.

Mounted in connection with the upper outward extensions 15' of the side frame structures 15 are relatively small idler sprockets 19, which are disposed in upwardly and outwardly offset relation to said drive sprockets 16. Mounted to run over and between corresponding drive and idler sprockets are conveyer chains 20. The upper and effective or outgoing course of each conveyer chain is guided to move in a predetermined path whereby as it leaves the drive sprocket 16 it curves upwardly to point adjacently below the idler sprocket 19, moving thence perpendicularly upward to pass over the latter. To hold the said effective courses of the conveyer chains to such predetermined paths of movement, correspondingly shaped pairs of guide rails 21 and 22 are provided, the same being suitably supported by brackets 23 which are affixed to and extend from the side frame structures 15. The conveyer chains 20 are equipped with laterally projecting track lugs 24 to engage and ride between said guide rails. Affixed to said conveyer chains 20, at suitably spaced intervals along the same, are rack rod engaging hooks 25.

Suitably mounted, for cooperation with the receiving end of the conveyer mechanism above described, is a rack rod magazine 26 having a rod delivery chute 27, the discharge end of which inclines downwardly and forwardly toward and which terminates adjacent to the rear sides of drive sprockets 16, and conveyer chains 20 passing over the latter, and so as to hold the lowermost rack rod contained in said chute 27 in the path of movement of approaching conveyer borne hooks 25, whereby said rack rod may be picked by the latter and then carried by the conveyer mechanism.

Mounted in suitably supported connection with the upper outward extensions 15' of the side frame structures 15, to extend horizontally outward from the respective idler sprocket carried ends of the dough string looping conveyer chains, are relatively high speed outgoing transfer conveyer chains 28, and extending horizontally outward from and cooperative with the outer ends of said transfer conveyer chains 28 are relatively slow speed discharge conveyer chains 29.

The means for driving the dough string looping conveyer chains, comprises a main drive shaft 30 journaled to extend transversely between the side frame structures 15 below the path of movement of loaded rack rods. Said main drive shaft 30 may suitably be driven from any source of power, but preferably is driven by an electric motor 31 through a sprocket and chain or other suitable transmission 32. Fixed on said main driving shaft 30 are drive sprockets 33 for operating drive chains 34 which run over driven sprockets 35 fixed on the shafts 17. Said drive sprockets 33 and driven sprockets 35 are of such relative sizes as to furnish a reduction suitable to obtain a desired speed of movement of the dough string looping conveyer mechanism. The relatively high speed transfer conveyer chains 28 are directly driven by chain sprocket transmissions 36 from said main shaft 30, preferably without reduction, so that the same are caused to move at a higher speed than that of the dough string looping conveyer chains 20. The slow speed discharge conveyer chains 29 may be driven at a speed relatively lower than that of said high speed transfer conveyer chains 28 in any suitable manner, such as by chain and sprocket transmissions 37 operated from the shafts 17 of the dough string looping conveyer mechanism.

Suspended from a suitable supporting means, such as the transverse bar 38, to extend downwardly from a point adjacently below the extrusion press die plate 12 toward the dough string looping conveyer mechanism, and so as to be disposed intermediate the rows of dough strings expressed from the extrusion press, is a swingable dough string control means. This control means is in the form of a light weight endless apron loop 39 of a width somewhat exceeding the length of the rows of dough strings expressed from the extrusion press. Said apron loop is laterally expanded at its lower free end portion by means of a cylindrical spreader member 40, inserted lengthwise through the lower bight of said apron body. The apron loop 39 is preferably made of a light weight textile fabric, such as cheese-cloth or the like, and the spreader member 40 may comprise a cylinder formed of light weight wire mesh material or the like, which is adapted to retain its cylindrical shape without tendency to collapse. The length of said apron approximates about one half of the distance between the press die plate 12 and the effective course of the chains of the dough string looping conveyer mechanism, where the latter traverse the tops of the drive sprockets 16; and since the distance between the idler sprockets 19 of said dough string looping conveyer mechanism and the press die plate 12 is less than the distance between the latter and said drive sprockets 16 of said conveyer mechanism, the length of the apron loop 39 exceeds half the former distance. When said suspended apron loop occupies its normal perpendicular position (as shown in Fig. 1), the spread free end portion thereof serves to separate and spread laterally apart the rows of dough strings issued from the press die plate 12, so as to cause said rows to straddle a conveyer carried rack rod R normally disposed in alignment with and below said apron loop (see Fig. 1). Additional functions of the apron loop will be disclosed hereafter when describing the operation of the rack rod loading mechanism.

Means are provided for automatically cutting away, at proper times, the rows of dough strings issued by the press so as to liberate the same from the press die plate. This means, in one form thereof, shown in Figs. 1 and 2, comprises a cutter blade 41 supported at its respective ends by pivoted levers 42, to the upper ends of which said blade ends are pivotally fulcrumed in such manner that the blade may be yieldably rocked by spring means 43 in such manner as to urge, at all times, its cutting edge toward and in engagement with and for transverse across the under face of the press die plate 12. Timed operative control of said levers 42, with consequent timed operation of the cutter blade 41 relative to operative movements of the dough string looping conveyer mechanism, is attained by means of suitably shaped cams 44 which are mounted on and rotated by said shafts 17. These cams include along their peripheries properly and relatively positioned first cutting stroke cam sections 45 and second cutting stroke cam sections 46. Said cams cooperate with the suitably shaped end portions 47 of the lower arms 48 of said levers 42. Said levers 42 are yieldably urged into co-operative relation to the cams 44 by suitable means, such e. g. as the pull springs 49.

The rack rod loading mechanism is intermittently operated in timed relation to successive emissions of dough strings by the extrusion press. When utilizing the rack rod loading mechanism of this invention in cooperative relation to an extrusion press of the type disclosed in my aforesaid copending application Ser. No. 244,198, wherein the press plunger is reciprocated and a complete row or rows of dough strings emitted by each downward movement of the plunger and the press chamber reloaded upon each upward movement of the plunger, the timed control of said rack rod loading mechanism is such that the same dwells inactive while the rows of dough strings are being expressed, but operates to load the emitted dough strings while the press plunger is being retracted and the press chamber charged with dough. This mode of operation, in such case, is automatically attained as follows:

The circuit supplying operating power to the motor 31 is controlled by limit switch means of suitable kind, viz. a switch means A cooperative with the press plunger member 13 and a second switch means B cooperative with a cutter blade lever 42; all in such manner that a switch actuator 50 carried by the press plunger member 13 is brought into engagement with switch A upon completion of the extrusion stroke of said plunger member 13, thereby closing the motor circuit and starting the motor 31 so as to transmit actuating power to the rack rod loading mechanism, and then, while the press plunger is being retracted and after the rack rod loading operation is completed by the final cutting stroke of the cutter blade mechanism, the effective lever 42 is carried, by the final cutting movement, into operative engagement with switch B, which functions to interrupt the motor circuit, until a succeeding extrusion stroke of the press plunger member ensues.

In such intermittent operation of the rack rod loading mechanism, the dough string looping conveyer is brought to rest in a position adapted to dispose a rack rod intermediate the rows of dough strings as emitted from the extrusion press (see Fig. 1). When the press plunger completes its extrusion stroke and the rows of dough strings are completely emitted, one of said rows S will lie in advance of the rod R and the other row S' behind said rod, so that when the switch A is actuated upon completion of the extrusion stroke of the press plunger, thereby starting the motor 31 and initiating operative movement of the dough string looping conveyer, said rod R will be thereupon carried against the forward row of dough strings S. The rod R contacts the dough strings approximately at mid points between their ends, and as the rod is moved outwardly and upwardly by the conveyer, the upper end portions of the dough strings will be suspended in a catenary curve extending between the rod R and the press die plate. By the time the rod R has been raised to a predetermined height, the rotation of the cams 44 carries their first cutting stroke sections 45 into actuating engagement with the levers 42—47—48, thereby rocking the same on their fulcrums so as to advance the cutting blade 41 sufficiently to cut through the dough strings S, thus severing the same from the die plate 12, whereupon the thus freed upper portions of said strings drop to the dotted position shown in Fig. 3 thus completing the looping of said row of dough strings S over and upon rack rod R. In the meantime, the advance of the dough string looping conveyer when thus loading the forward row of dough strings S thereon, has carried around and upwardly succeeding rod supporting hooks 25, whereby a second rack rod R' has been picked up from the supply chute 27 and carried upwardly behind the rearward row of dough strings S', so that as the first rack rod R with the dough strings S suspended thereon is carried on and deposited upon the high speed transfer conveyer chains 28, the second rod R' is engaged with said rearward row of dough strings S' and thereupon carries the same upward and outward until their upper portions are suspended between the elevated rod R' and the press die plate 12 ready for severing. During this movement of the rearward row of dough strings, the same will bear against the apron loop 39 which will yield to the movement thereof by swinging upward under the lift of the same (see Fig. 4). Said apron loop 39 being of light weight will not injuriously stretch or break the dough strings; in fact its engagement therewith is beneficial than otherwise, since the contact thereof imposes frictional resistance to lengthwise movement, slip or other displacement of the strings relative to the rods engaged by the latter, and thus avoids accidental dropping or slipping of the strings off of the rod when said strings are severed and released from the press die plate. Such advantage of the apron loop may be and sometimes is desirable in connection with the looping of the first row of dough strings S, in which case an additional apron loop 39' and spreader 40' may be suspended in front of said first row of strings S, as shown in connection with the modified form of loading mechanism illustrated in Fig. 5 of the drawings.

Upon completion of the elevation of the second rack rod R' to the desired point, the rotation of the cams 44 carries their second cutting stroke sections 46 into actuating engagement with the levers 42—47—48 so that a second inward movement is imparted to the cutting blade 41, which causes the latter to sever the upper ends of said rearward row of dough strings S' from the press die plate, whereupon the thus freed upper portions of said strings drop to the dotted position shown in Fig. 4, thus completing the looping of said strings over and upon the rack rod R'. As this operation is completed, the next succeeding rod hooks 25 of the conveyer chains 20 are carried around past the supply chute 27 so as to pick up another rod R and deposit the same in normal initial position, pending a repetition of the above described cycle of rod loading operations. Upon completion of the described cycle of rod loading operations by the second cutting stroke of the cutting blade mechanism, the movement of the lower portions 48 of the levers 42 to the outer limit of swing carries one of said portions 48 into operative engagement with the limit switch B which is thereby operated to interrupt the motor circuit, thus stopping the loading mechanism, until the extrusion press has been recharged and another batch of dough expressed to form succeeding rows S and S' of dough strings, whereupon the described cycle of rod loading operations is repeated.

In as much as the transfer conveyer chains 28 move at relatively high speed, it will be obvious that as a loaded rack rod is carried by the engaging hooks 25 over the idler sprockets 19, the open sides of said hooks will approach the conveyer chains 28, but before reaching the latter will be so positioned that the rod will drop by gravity out of engagement therewith and down upon said fast moving transfer conveyer chains 28, whereby the loaded rod is rapidly moved outwardly and away with sufficient speed to allow the thus emptied hooks 25 to pass behind them as they are carried back and downwardly in company with the return courses of the conveyer chains 20.

It will be obvious that, as the loaded rods are moved outwardly by the transfer conveyer chains 28, the same will be conveyed by the latter to and successively delivered upon the relatively slowly moving discharge conveyer chains 29, from which they may be removed for deposit in a drying room or the like.

Figure 5:
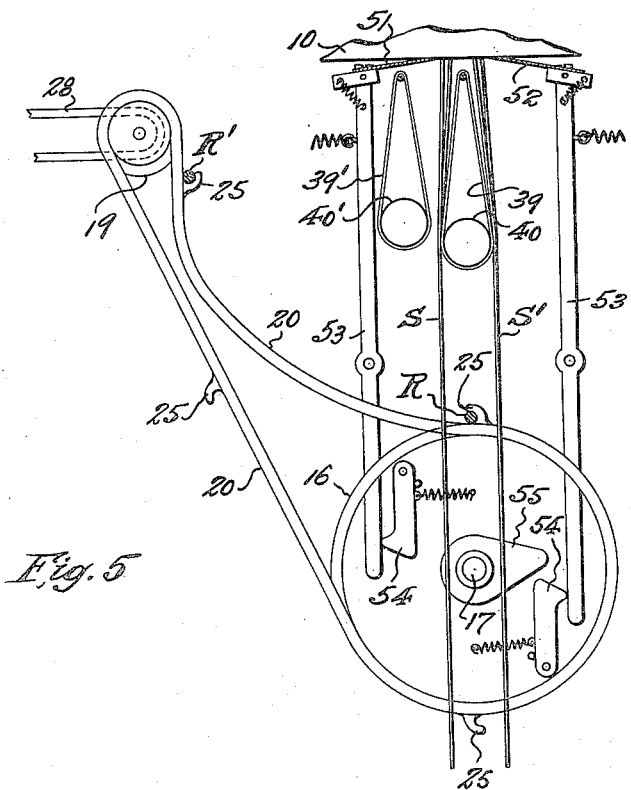
Fig. 5 is a schematic view, showing a modified form of the novel rack loading mechanism of this invention.
Figure 6:
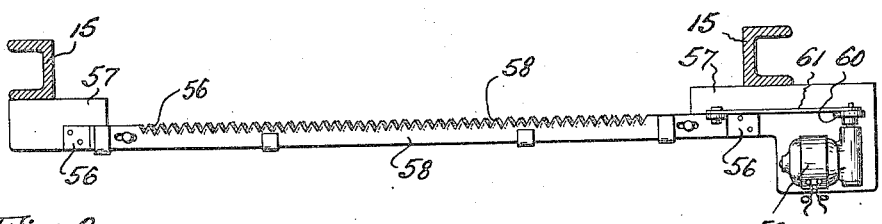
Fig. 6 is a plan view of the dough string trimmer means with which the loading mechanism is provided.

The means for cutting away the extruded dough strings from the press die plate 12, as above described, comprises a single cutting blade means adapted to be operated in two timed stages, the first stage of operation serving to sever the forward row of strings S, and the second stage of operation serving to sever the rearward row of strings S'. An alternative or modified form of the cutting means is shown in Fig. 5, and comprises two cutting blades 51 and 52 respectively opposed to the exterior sides of the respective rows of dough strings S and S'. Each cutting blade is carried by pivoted actuating levers 53, the lower arms of which are operatively engaged by pivoted thrust levers 54. Said thrust levers 54 are actuated by cams 55 fixed upon and rotated by the dough string looping conveyer shafts 17. It will be obvious that the cams 55 will first engage and operate, at proper times, the actuating lever system for the cutting blade 51, and thereafter will, at proper times, engage and operate the actuating lever system for the cutting blade 52, thus successively cutting away the rows of dough strings S and S' at the proper stages of manipulation of the latter by the dough string looping conveyer mechanism. When this type of modified cutting mechanism is employed, the limit switch B will be located so as to be operatively engaged at proper times by the lever system of the cutting blade 52.

Means are provided for evenly trimming the extremities of the dough strings looped over and suspended on the rack rods. This means comprises a stationary toothed cutter blade 56 supported by brackets 57 from the side frame structure so as to extend transversely therebetween in properly spaced relation below the lever of the discharge conveyer chains 29, and so as to lie in the path of outward movement of the extremities of the suspended dough strings as carried outwardly by said discharge conveyer means. Cooperating with said stationary cutter blade 56 is a suitably guided longitudinally reciprocable movable toothed cutter blade 58. Means is provided for reciprocating the movable cutter blade 58 relative to the stationary cutter blade 56. An illustrative form of such means comprises an electric motor 59 arranged to drive a crank wheel 60, said crank wheel being operatively connected to the adjacent end of said movable cutter blade 56 by a connecting rod 61.

From the above description of illustrative embodiments of this invention, it will be obvious that the same provides a completely automatic rack rod loading mechanism which obviates all necessity for manual handling of the extruded dough strings, and which is therefore highly sanitary. The dough string looping conveyer mechanism, by reason of its lifting and inwardly moving effect upon the rack rods relative to the press die plate 12, assures that sagging curvature of the trailing end portions of the dough strings which is best calculated to retain the same against longitudinal slippage or relative lateral displacement on the rack rods. Such efficient control is further augmented by the action of the novel apron loops, since the frictional engagement thereof with the sagging portions of the strings acts also to prevent displacing movement of the latter, while at the same time, when the strings are cut away from the press die plate, by their gravitation aids in quickly swinging down into place said trailing end portions of the dough strings.

I am aware that various changes could be made in the above described rack rod loading mechanism for alimentary paste presses without departing from the scope of my invention as defined in the following claims; hence it is intended that all matter described in the foregoing specification and shown in the accompanying drawings shall be interpreted as illustrative and not in a limiting sense.

I claim:

1. In an automatic rack rod loading mechanism for cooperation with a press apparatus adapted to extrude dough strings in a linear row comprising, a dough string looping conveyer having means to engage and carry a rod against an extruded row of strings with upward lifting effect upon the mid-portions of said strings whereby the trailing portions of the latter are caused to sag in catenary curves between the press die plate and the rod, means to thereafter cut away said thus disposed trailing portions from the press die plate, and a swingable apron means adapted to engage said trailing portions of the strings in opposition to the rod and to swing upwardly with said trailing portions under the uplifting thrust of said rod until said strings are cut free from the press die plate.

2. In an automatic rack rod loading mechanism as defined in claim 1, a discharge conveyer means to receive loaded rack rods, and a relatively fast moving transfer conveyer means intermediate the discharge end of said dough string looping conveyer and the receiving end of said discharge conveyer.

3. In an automatic rack rod loading mechanism for cooperation with a press apparatus adapted to extrude a plurality of linear rows of dough strings in parallel relation comprising, a dough string looping conveyer having means to engage and successively carry rods respectively against the respective extruded rows of strings with uplifting effect upon mid-portions of said strings whereby their trailing portions are caused to sag in catenary curves between the engaging rods and the press die plate, swingable apron means suspended intermediate said extruded string rows so as to space apart the rod engageable portions thereof, cutting means to sever said string rows at proper times from the press die plate, and cam means operative to actuate said cutting means in timed relation to the rod moving and string looping operations of said conveyer.

4. In an automatic rack rod loading mechanism as defined in claim 3, a discharge conveyer means to receive load rack rods, and a relatively fast moving transfer conveyer means intermediate the discharge end of said dough string looping conveyer and the receiving end of said discharge conveyer.

5. In an automatic rack rod loading mechanism as defined in claim 3, a discharge conveyer means to receive and carry away loaded rack rods from said dough string looping conveyer, means to evenly trim the end portions of the dough strings loading said rods, said latter means comprising cooperating stationary and movable toothed cutter blades extending across the path of movement of said dough string end portions and beneath said discharge conveyer means, and means to reciprocate the movable cutter blade.

6. In an automatic rack rod loading mechanism for cooperation with a press apparatus adapted to extrude a plurality of linear rows of dough strings in parallel relation comprising, a dough string looping conveyer having means to engage and successively carry rods respectively against the respective extruded rows of strings with uplifting effect upon mid-portions of said strings whereby their trailing portions are caused to sag in catenary curves between the engaging rods and the press die plate, cutting means to sever said string rows at proper times from the press die plate, cam means operative to actuate said cutting means in timed relation to the rod moving and string looping operations of said conveyer, and swingable apron means in advance of each string row and respectively adapted to engage trailing portions of the strings of said respective rows in opposition to the respective rods brought into engagement therewith, said apron means being adapted to swing upwardly with the trailing portions of strings engaged thereby when uplifted by the movement of the engaging rods and to maintain contact therewith until said strings are cut free from the press die plate.

7. The combination with press apparatus adapted to intermittently extrude dough through a die to form strings thereof arranged in a linear row of automatic rack rod loading mechanism cooperative therewith, said latter means including an endless conveyer mechanism having spaced rack rod supporting hooks, and means for intermittently actuating said conveyer mechanism in alternated timed relation to the extruding phases of said press operations whereby said conveyer mechanism idles during extrusion of dough strings by the press and operates only during the intervals between extrusion strokes of said press.

8. In the combination as defined in claim 7, wherein the rod loading mechanism is adapted to carry a rod against an extruded row of strings with upward lifting effect upon mid-portions of said strings whereby the trailing portions of the latter are caused to sag in catenary curves between the press die plate and the rod, and means directly cooperative with the discharge face of the press die to thereafter cut away said thus disposed trailing string portions from the press die plate.

9. In the combination as defined in claim 7, wherein the rod loading mechanism is adapted to carry a rod against an extruded row of strings with upward lifting effect upon mid-portions of said strings whereby the trailing portions of the latter are caused to sag in catenary curves between the press die plate and the rod, means to thereafter cut away said thus disposed trailing portions from the press die plate, and swingable apron means adapted to engage said trailing portions of the strings in opposition to a rod and to swing upwardly with said trailing portions under the uplifting thrust of said rod until said strings are cut free from the press die plate.

10. The combination with press apparatus adapted to intermittently extrude a plurality of linear rows of dough strings in parallel relation of automatic rack rod loading mechanism cooperative therewith, and means for intermittently actuating said rod loading mechanism in timed relation to the operations of said press apparatus whereby said loading mechanism idles during extrusion of dough strings by the press and operates only during the intervals between extrusion strokes of said press, said rod loading mechanism comprising a dough string looping conveyer having means to engage and successively carry rods respectively against the respective extruded rows of strings with uplifting effect upon mid-portions of said strings whereby their trailing portions are caused to sag in catenary curves between the engaging rods and the press die plate, cutting means to sever said string rows at proper times from the press die plate, cam means operative to actuate said cutting means in timed relation to the rod moving and string looping operations of said conveyer, and swingable apron means in advance of each string row and respectively adapted to engage trailing portions of the strings of said respective rows in opposition to the respective rods brought into engagement therewith, said apron means being adapted to swing upwardly with the trailing portions of strings engaged thereby when uplifted by the movement of the engaging rods and to maintain contact therewith until said strings are cut free from the press die plate.

11. The combination as defined in claim 10 including, a discharge conveyer means to receive and carry away loaded rack rods and a relatively fast moving transfer conveyer means intermediate the discharge end of said dough string looping conveyer and the receiving end of said discharge conveyer.

12. The combination as defined in claim 10 including, a discharge conveyer means to receive and carry away loaded rack rods, a relatively fast moving transfer conveyer means intermediate the discharge end of said dough string looping conveyer and the receiving end of said discharge conveyer, and means to evenly trim the end portions of the dough strings loaded on said rods, said latter means comprising cooperating stationary and movable tooth cutter blades extending across the path of movement of said dough string end portions and beneath said discharge conveyer means, and means to reciprocate the movable cutter blade.

13. In automatic rack loading mechanism of the kind described having a loading conveyer means to carry racks into operative engaging relation to paste strings to be mounted thereon, a discharge conveyer means to receive the loaded racks from the loading conveyer, and means located beneath said discharge conveyer in the path of movement of the extremities of rack rod supporting strings carried thereby for evenly trimming said string extremities, said means comprising cooperating stationary and reciprocably movable toothed cutter blades extending across the path of movement of said string extremities, and means for reciprocating said movable cutter blade relative to said stationary cutter blade.

JOSEPH DE FRANCISCI.